United States Patent [19]

Rones

[11] Patent Number: 4,680,015

[45] Date of Patent: Jul. 14, 1987

[54] EYE AND BINOCULAR VISION DEMONSTRATOR

[76] Inventor: Harvey C. Rones, 2078 Irving Ave., Astoria, Oreg. 97103

[21] Appl. No.: 782,127

[22] Filed: Sep. 30, 1985

[51] Int. Cl.⁴ .............................................. G09B 23/32
[52] U.S. Cl. .................................................. 434/271
[58] Field of Search ........................ 434/268, 271, 380

[56] References Cited

U.S. PATENT DOCUMENTS

| | | | |
|---|---|---|---|
| 1,135,222 | 4/1915 | Suffa | 434/271 |
| 1,476,621 | 12/1923 | Kintner | 434/271 |
| 1,722,518 | 7/1929 | Desmond | 434/271 |
| 1,832,603 | 11/1931 | Witt | 434/271 |
| 1,981,964 | 11/1934 | McFadden | 434/271 |
| 2,200,060 | 5/1940 | Geiser | 434/380 |
| 3,688,008 | 8/1972 | Krieger | 434/268 |

*Primary Examiner*—William H. Grieb
*Attorney, Agent, or Firm*—Timothy N. Thompson

[57] ABSTRACT

An eye and binocular vision demonstrator is disclosed. The demonstrator comprises a casing having a pair of simulated eyeballs therein. A pair of rods butt against the lenses of the eyeballs, causing the lenses to change their curvature, or focus. A pair of overlaping drawings of the afferent and efferent nerve paths are also simulated.

3 Claims, 6 Drawing Figures

FOCUS FUNCTION

EYE AND BINOCULAR VISION DEMONSTRATOR

In the explanation of a patient's focus functions, it is preferable to utilize any mechanically adjustable simulator to indicate related changes and their conscenses to that patient so as to instill understanding along with confidence. The object of my invention is to provide a display device for mechanically presenting information to an observer. More particularly, this invention relates to a visual educational display apparatus for demonstrating the related functions of the eye muscles and lenses to be known as the Binocular Eye and Vision Demonstrator.

With the binocular eye and vision demonstrator is presented a practical, systamatic demonstration of the ciliary muscles changing the focus of the crystaline lenses, known as accommodation, in relation to the external recti muscles turning the eyeballs inward, known as convergence, as two parts of the focus function of vision.

Another object of my invention is to provide a means for mechanically simulating the independent function of the crystaline lenses during various anatomical defects, and their corrections, for clearer understanding I also provide an illuminated device whereby the autonomics of the involuntary nervous system, and the optic nerve track, through a set of overlay diagrams, are clearly shown in the related focus functions of the demonstrator device.

Figure 1:
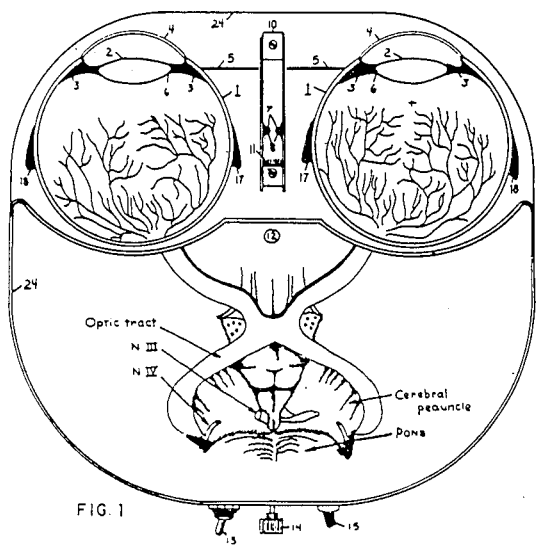
Figure 2:
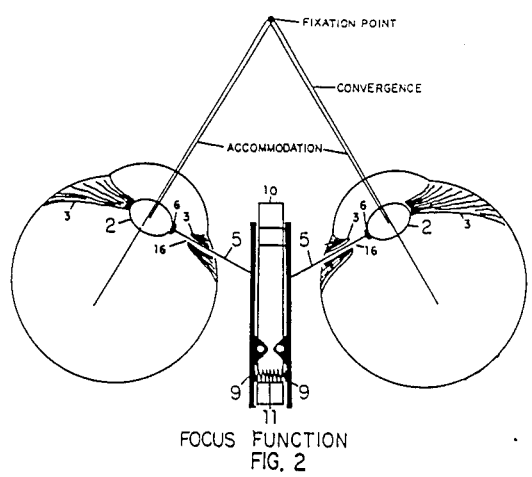
Figure 3:
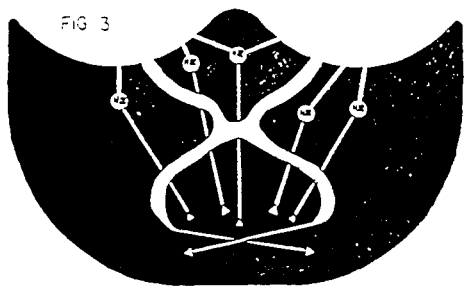
Figure 5:
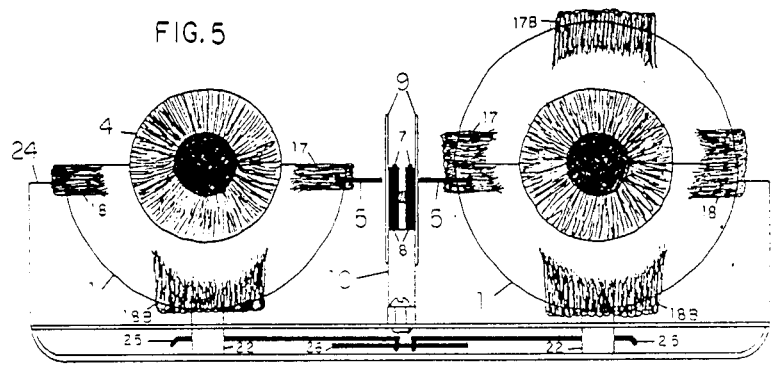
Figure 4:
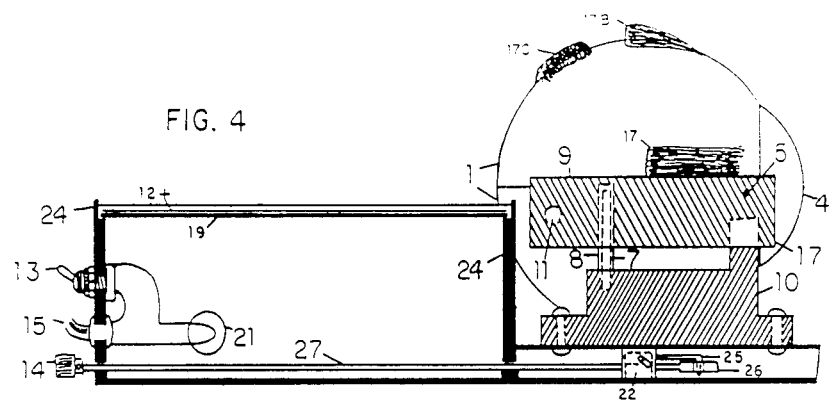
Figure 6:
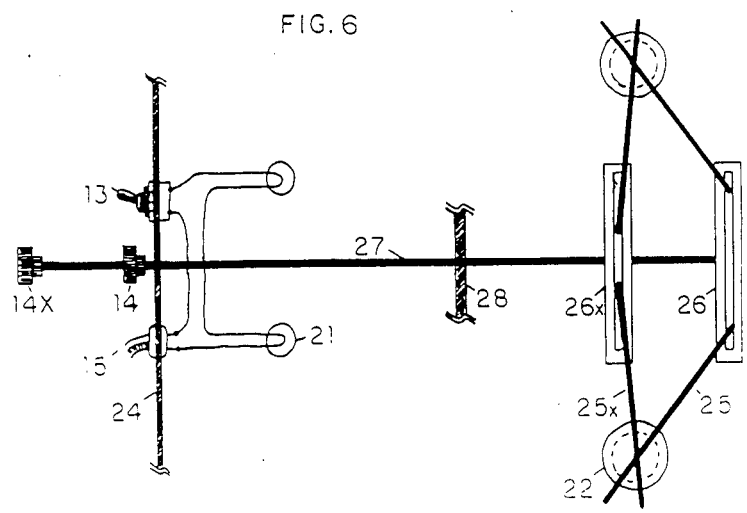

The mechanical functions stated objectively will be hereinafter described in further detail of construction and operation, in conjuction with the drawings provided in which FIG. 1 is a top view of the demonstrator. FIG. 2 is a detailed view of the focus function and lenses, with their changing mechanisms; FIG. 3 is an underlayment mask of the efferent nerve pathways, in relation to the optic track; FIG. 4 is a side view of the demonstrator; FIG. 5 is a front view of the demonstrator; FIG. 6 is an inner view of the base mechanisms for the functional operations.

Referring to FIGS. 1,4,5, this apparatus consists of a housing 24 upon which is mounted two hollow spherical members 1 representing "eyeballs". Each eyeball 1 contain within; a representation of the "ciliary muscles" 3, through which a rod 5 slides through and is attached 6 to a flexible clear material 2 formed to represent the "crystaline lens". Also within the eyeball 1 is a thin curved flexible material 4; that is removable (FIG. 5) by pinching to represent the "cornea", placed in front of the pupil. The rear, bottom of each eyeball is painted in such a manner to represent "blood vessels" and "retinal nerves" (FIG. 1)

The said eyeballs 1 formed of two halfs; the upper being removable as a lid; have areas of buildup 17, 17B, 17C, 18, 18B, on the outside, formed and painted to represent "recti muscles". Each eyeball pivits on cylindrical bases 22 when activated by the manual mechanics of FIG. 6.

Also in FIGS. 1, 4, 5 (also 2) is the upper mechanics related to FIG. 6 consisting of a retaining base 10 which also acts as a stop 17 for flaps 9. The retaining base 10 is mounted to the housing 24 and contains the pins 7 upon which the pivital portion 8 of the flaps 9 pivit when activated by the mechanics of FIG. 6 or when returned to a stop position 17 by the spring 11 mounted in the rear of the flaps 9 (FIG. 4).

In FIG. 6 we have the mechanics of the eyeball movements consisting of a rod 27 which slides through the housing 24 at two points, (the inner point being marked as 28) and connects to a sloted bar 26. Arms 25 pass through the cylindrical bases 22 and hook into the slot of bar 26 (FIG. 6). Also shown are: the power entrance 15, the light 21, the switch 13 and the connecting circuits.

The housing 24 (FIG. 1) contains a drawing of the "optic tract" 12 which consists of a lower portion (FIG. 3): which acts as a light mask when a light 21 (FIG. 4) is turned on at the switch 13: The opened areas allow additional areas of the drawing 12 to light up and show more clearly the nerve paths to and from the cortex of the brain. The drawing 12 and the schematic mack (FIG. 3) are supported by a clear piece of material 19.

I claim:

1. I claim an eye and bonocular vision demonstrator for demonstrating the binocular focus function of vision, Comprising;

A casing having upper and lower levels; the lower level having means to hold two simulated eyeballs;

A pair of simulated eyeballs, including simulated recti muscles, mounted in the lower level of said casing, said eyeballs each being divided into upper and lower sections, the upper sections being removable and the lower sections containing simulated anatomical features, including lenses;

said lenses being secured with rods extending through simulated ciliary muscles butting against the lenses;

A means in the rear of the casing for turning the eyeballs inward, simulating convergence; and the inward pressure of said rods pushing against the lenses causing the lenses to change their curvature, thereby simulating focus accommodation.

2. I claim an eye and binocular vision demonstrator as described in claim 1. also comprising; A first drawing of afferent nerve paths on transparent material;

A second drawing of efferent nerve paths on a dark background; said first drawing being mounted in said casing above the second drawing; A lighting means within the casing to illuminate the first and second drawings so they are visible on the upper part of the casing.

3. Binocular eye and vision demonstrator having two eyeballs with removable corneas upper and lower halves, flexable crystaline lenses with rods extending through the nasal section of the ciliary muscles butting onto the plates mounted between the eyeballs, the eyeballs are mounted on the lower section of the casing having an upper and lower section, displayed on the upper section of the casing directly back of the eyeballs is the optic nerve tract transmitting the images from the eyes to the cerebral section of the brain, under the nerve tract a second drawing of the afferent motor nerves supplying energy to the eye muscles and is visible only when the lights in casing are turned on, pulling the knob on the rear of the casing turns the eyes inward convergence, this puts pressure on the rods forcing the crystaline lenses to increase thier curvature, accommodation.

* * * * *